Figure 1:
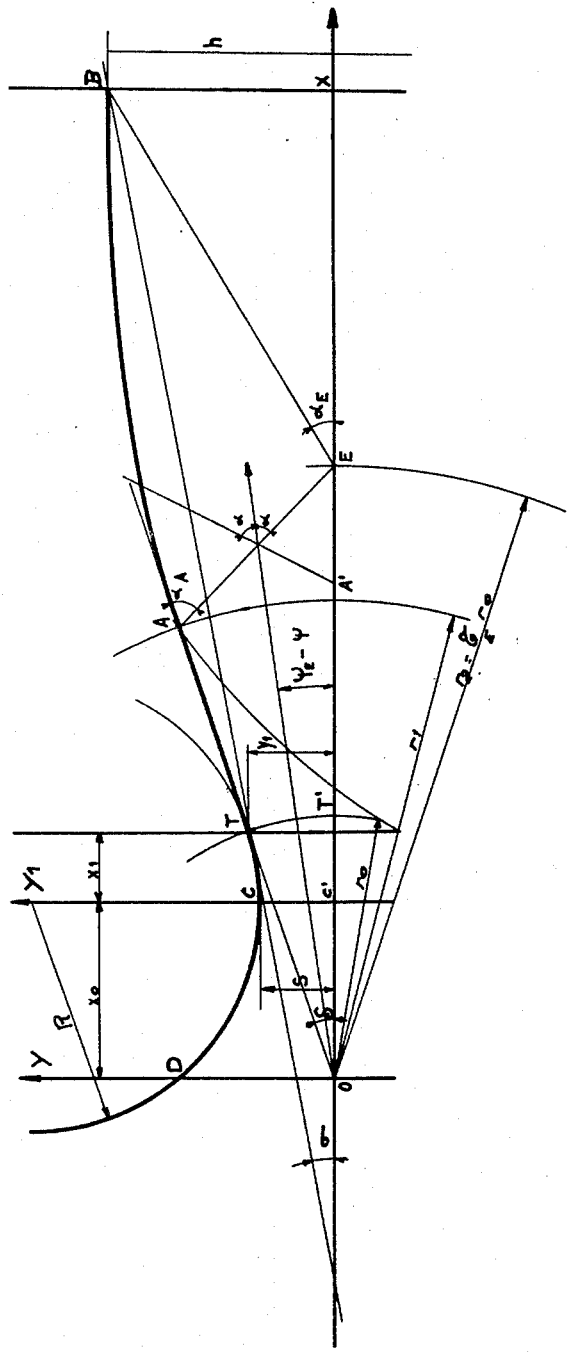

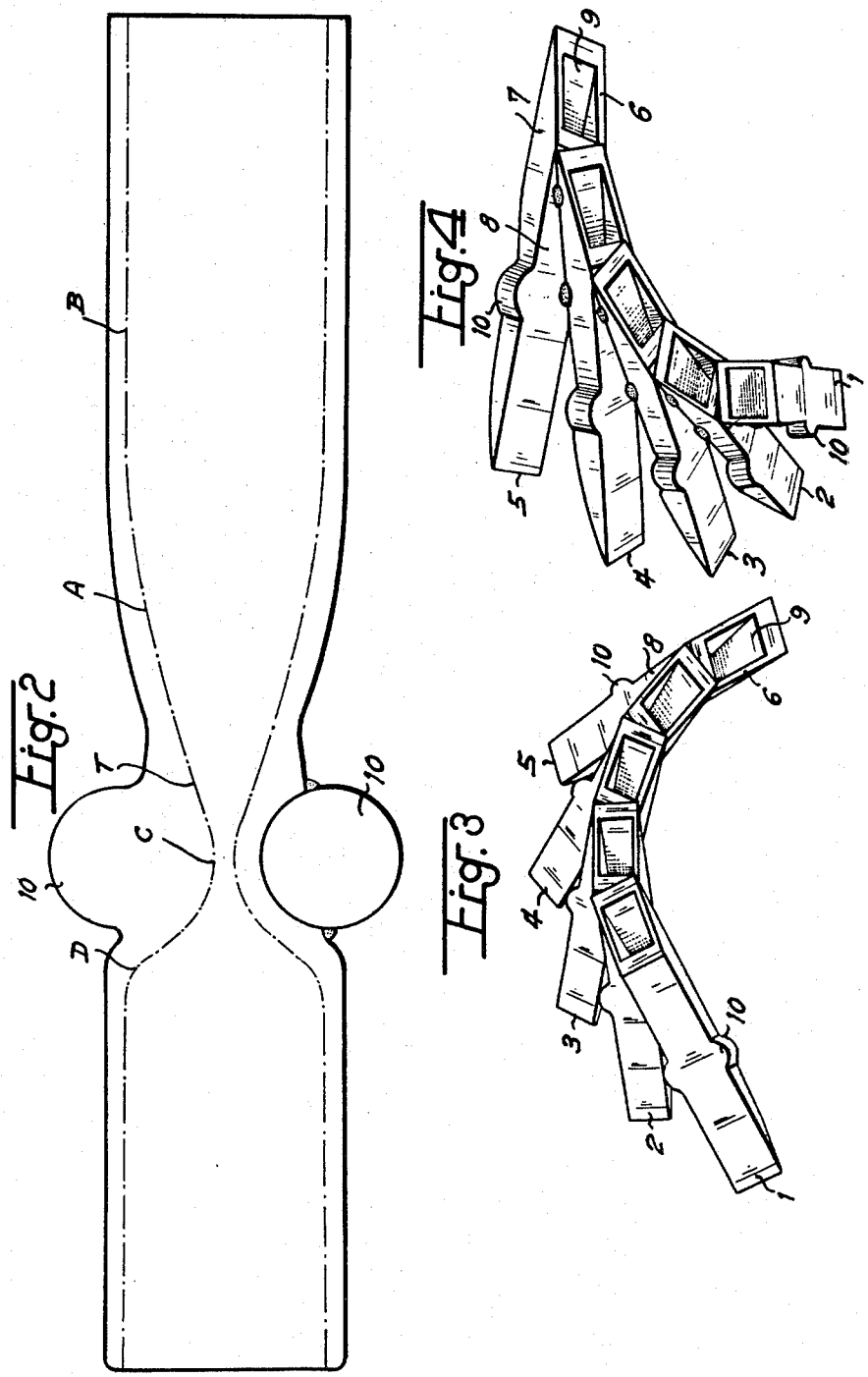

United States Patent Office 3,189,321
Patented June 15, 1965

3,189,321
NOZZLE AND ITS APPLICATIONS, ESPECIALLY FOR THE SUPPLY OF TURBINES
Georges Devillard, Bourg-la-Reine, and Léon Coriat, Paris, France, assignors to Etablissements Codeco, Vaduz, Liechtenstein, a company of Liechtenstein
Filed May 21, 1962, Ser. No. 196,291
Claims priority, application France, May 23, 1961, 862,506, Patent 1,297,810
1 Claim. (Cl. 253—78)

The present invention has for its object a new nozzle designed to meet with a large number of applications and especially although not exclusively intended to be employed for the supply of turbines such as, for example, steam turbines and gas turbines.

A nozzle in accordance with the present invention is constituted by two flat parallel walls which will be designated hereunder as bases, and by two symmetrical lateral walls, each of which is generated by the displacement of a straight line which remains perpendicular to the bases and bears on a curve such that said nozzle comprises a first convergent transonic zone, a neck, a supersonic expansion zone and finally a transition zone.

In the supersonic portion of the nozzle, this curve has a curvature such that the nozzle brings the velocity of the fluid to a uniform value in a direction parallel to the axis, the above-mentioned bearing curve being defined in this zone by the analytical method which will be explained below.

The hypotheses of definition of the profile are as follows:

It is considered that the expansion is isentropic and that in the adjoining region of the neck, there takes place a two-dimensional flow from a source (radial lines of current).

The definition of the bearing curve will be more clearly understood with reference to FIG. 1 which illustrates one arrangement thereof.

The said curve comprises a transonic zone DCT, the point D being on the ordinate of the coordinates X, Y, whose point of origin is O and the point T being at a distance $r_0$ from the origin O and having an ordinate $y_1$ which will be defined later.

In the following description, the following notations will be employed:

$M$ = Mach number of the flow
$\alpha$ = Mach angle (sin $\alpha = 1/M$)
$\psi$ = Angle of expansion of the Mach line
$r$ = Vector radius at a current point
$r_0$ = Radius of the sonic arc
$\tau = r/r_0$ The quantities $M$, $\alpha$, $\psi$, $r$, $\tau$ are variable, the final values thereof are indicated by the subscript E, at a given point A by the subscript A and at point of origin O by the subscript O.

$\sigma$ = Mean angle of slope of the nozzle
$\delta$ = Maximum local angle of slope (½ angle at the origin O)
$h$ = Height of nozzle-outlet.

There is then found a supersonic expansion zone TA which is defined hereunder, then a transition zone AB.

If we take the notations which have just been indicated, and with S designating the half-height of the neck at the point C, and $S_0$ designating the half-height of the neck at the point O ($S_0$ equal to the distance OD) we have:

$$\delta = \frac{h}{S(\tau_E)}$$

$$\tau = \frac{S}{S_0} = \psi(M_E)$$

In this transonic zone, there is chosen a priori for the profile of the neck a circle having a radius R and whose center lies on a line $Y_1$ which is parallel with ordinate Y and passes through the point C. It is deduced therefrom that the coordinates $(X_1, Y_1)$ of the point T and the distance $(x_0)$ between the line $Y_1$ and ordinate Y can be obtained from the following equations:

$$x_1 = R \sin \delta$$
$$y_1 = S + R (1 - \cos \delta)$$
$$x_0 = \frac{S \cos \delta - R (1 - \cos \delta)}{\sin \delta}$$

Insofar as concerns the supersonic expansion zone TA, the symbol $d$ equals the distance between points T and A and this distance will first be determined by means of the equation:

$$d = r_0(\tau_A - 1) = \frac{h(\tau A - 1)}{S(\psi_E - A)\tau_E}$$

The mean angle of slope $\sigma$ will then be determined by the formula:

$$\tan \sigma = \frac{(\psi_E - \psi_A)\tau_E - \sin (\psi_E - \psi_A)}{\tau_E - \cos (\psi_E - \psi_A) + (\psi_E - \psi_A) E\sqrt{E^2 - 1}}$$

with the result that the necessary elements will be obtained for the definition of this portion of the curve.

Finally, in the transition zone, the points of the curve will be plotted by taking into account the fact that:

$$\frac{x}{h} = \frac{\cos (\psi_E - \psi)}{2(\psi_E - \psi)} \frac{\tau}{\tau_E}\{1 + (\psi - \psi_A)|\sqrt{M^2 - 1} - \tan (\psi_E - \psi|)\}$$

$$\frac{y}{h} = \frac{\sin (\psi_E - \psi)}{-2(\psi_E - \psi)} \frac{\tau}{\tau_E}\{1 + (\psi - \psi_A)|\sqrt{M^2 - 1} + \cot (\psi_E - \psi)|\}$$

$\psi$ is the variable. M and $\tau$ are deduced from $\psi$ by means of nomograms and are calculated by:

$$\psi = \sqrt{\frac{\alpha+1}{\gamma-1}} \text{ arc tan} \sqrt{\frac{\alpha-1}{\gamma+1}(M^3 - 1)} - \text{arc tan}\sqrt{M^2 - 1}$$

$$\tau = \frac{\left[\left(\frac{2}{\gamma-1}\right)\left(1 + \frac{\gamma-1}{2}M^2\right)\right]}{M}^{\frac{\gamma+1}{2(\gamma-1)}}$$

$\psi$E, $\tau_E$ and $\psi$A are constants.

In a given case, it will therefore be possible to construct the corresponding curve and therefore to produce a model of the nozzle. The said model can then be reproduced by any known means.

In practice, the construction of a nozzle in accordance with the invention is preferably carried out by casting in one piece open nozzles of stainless steel or of monel metal, that is to say nozzles which comprise a base and two lateral walls.

The interior of the casting which is thus formed is then polished by hand, then milled, and the second base which closes the nozzle is added by electric welding.

There is accordingly obtained a nozzle such as that which is illustrated in FIG. 2, in which is shown the external profile of the nozzle, the internal profile being illustrated in chain-dotted lines. In this arrangement, the points D, C, T, A, B as determined above are again met with.

The present invention also comprises the application of nozzles such as those which have been described above for the supply of turbines.

The invention consequently comprises by way of new industrial products, two injection half-sectors, each sector comprising a suitable number of nozzles which are coupled together in variable angular positions in such manner that each nozzle is directed according to the injection angle chosen. FIGS. 3 and 4 illustrate a half-sector of this type.

There can be seen at 1, 2, 3, 4 and 5 five nozzles which are each successively positioned in such manner that the axis thereof is suitably disposed according to the angle of injection of each of said nozzles, each nozzle comprising two bases 6 and 7 and two lateral walls 8 and 9, and these two latter being defined in the manner which has been indicated above.

When the location of each nozzle has been determined and the position-setting of each nozzle has been carried out with respect to the adjacent nozzles, a chamber having the requisite angles is machined on the side of each nozzle so as to permit the said nozzles to be coupled according to the mean diameter which is chosen, as can be seen in particular in FIG. 3.

As is subsequently shown in FIG. 4, the nozzles which are thus arranged are fixed in position with respect to each other by applications of weld, thereby constituting a single-piece unit, which is then placed in the mold and accordingly encased in the final half-sector for the supply of the turbine at the time of the subsequent pouring of the said half-sector of stainless steel or monel metal.

It will be noted that, inasmuch as the metals which constitute the nozzles and the metal of the encasing sector is of at least similar nature, the dangers of deformations during the casting process are substantial, mainly in the vicinity of the neck.

It is preferable to provide, at least in this portion, masses of metal such as the mass 10 which have the chief function of cooling elements.

The mode of execution of the invention which has just been described is understood to be given only by way of non-limitative example, and it is possible to make any detail modifications therein without consequently departing either from the scope or the spirit of the invention.

What we claim is:

An elongated nozzle construction comprising two flat parallel walls, two lateral walls extending between and perpendicular to said parallel walls throughout their length, said lateral walls have opposing interior surfaces arranged symmetrically with respect to the longitudinal axis of said nozzle and each of which is generated by the displacement of a straight line which is perpendicular to said parallel walls, said interior surfaces having corresponding arcuate wall portions of constant radius and defining a convergent transonic zone, a neck and an expansion zone of small axial length, said interior surfaces having further wall portions defining a divergent supersonic expansion zone extending axially away from said first-mentioned expansion zone and followed by a transition zone, the contours of said divergent supersonic expansion zone and said transition zone being defined so that the velocity of the fluid is brought to a uniform value in a direction parallel to the longitudinal axis of the nozzle.

References Cited by the Examiner

UNITED STATES PATENTS

| | | | |
|---|---|---|---|
| 740,332 | 9/03 | Stumpf | 253—78 |
| 764,887 | 7/04 | Goldsborough | 253—77 |
| 883,892 | 4/08 | Kieser | 253—78 |
| 951,346 | 3/10 | Stevens | 239—589 |
| 1,073,421 | 9/13 | Josse et al. | 253—78 |
| 1,778,126 | 10/30 | Sedlmeir | 253—78 |
| 2,701,412 | 2/55 | Wahlin | 29—157 |
| 2,971,250 | 2/61 | Wahlin | 29—157 |

FOREIGN PATENTS 24,751 of 1894 Great Britain.
439,773 12/35 Great Britain.

OTHER REFERENCES

"Advanced Fluid Mechanics" (R.C. Binder), published by Prentiss-Hall, New York, 1951, pages 31 and 32 relied on.

"Elementary Fluid Mechanics" (J. K. Vennard), published by John Wiley, New York, 1954, pages 370 and 371 relied on.

"Fluid Mechanics" (R. H. F. Pao), published by John Wiley, New York, 1961, pages 339 and 340 relied on.

JOSEPH H. BRANSON, Jr., *Primary Examiner.*
WALTER BERLOWITZ, LAURENCE V. EFNER,
*Examiners.*